(No Model.)
P. G. ROWLEE.
DRAFT EQUALIZER.
No. 264,343. Patented Sept. 12, 1882.
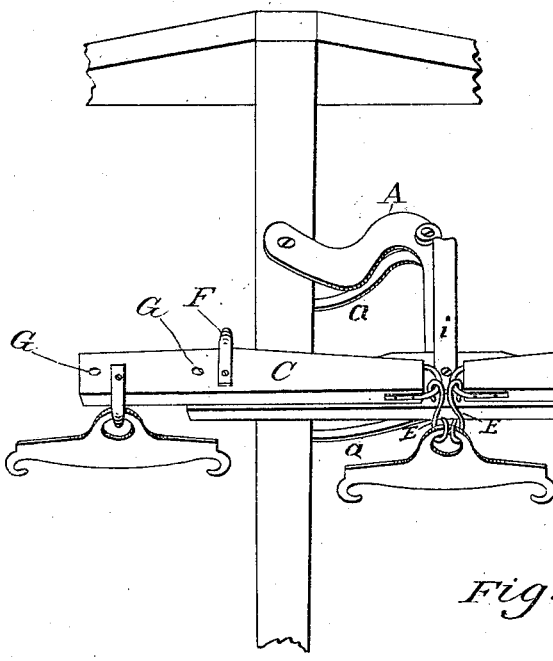
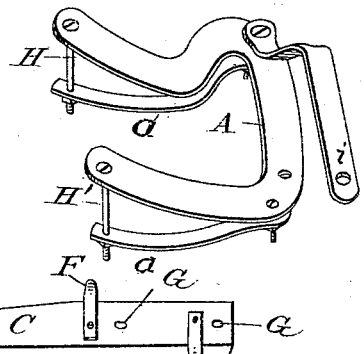
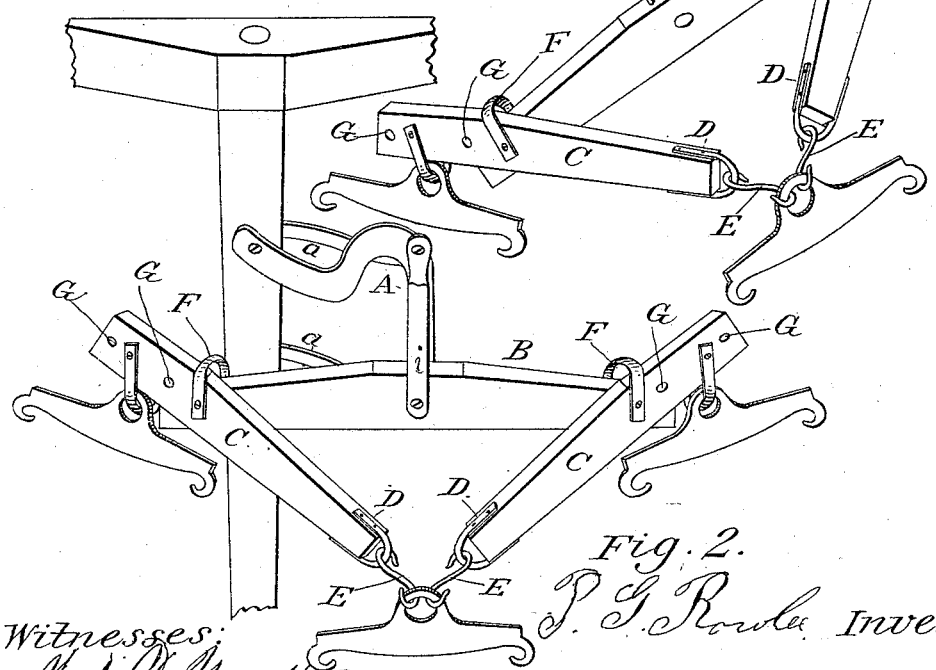
Witnesses:
P. G. Rowlee, Inventor

UNITED STATES PATENT OFFICE.

PHILESTER G. ROWLEE, OF HAMILTON, MICHIGAN.

DRAFT-EQUALIZER.

SPECIFICATION forming part of Letters Patent No. 264,343, dated September 12, 1882.

Application filed September 10, 1881. (No model.)

*To all whom it may concern:*

Be it known that I, PHILESTER G. ROWLEE, of Hamilton, Van Buren county, State of Michigan, have invented a new and Improved Three-Horse Equalizer, of which the following is a specification.

The nature of my invention relates to a new and useful improvement in that class of devices employed to work three horses abreast on a tongue or pole where two horses are used on one side of the tongue and one horse on the other side of the tongue, and by means of the device employed the draft will be equalized upon the three horses without perceptible side draft and upon the ordinary length of wagon-tongue.

My invention consists in the novel arrangement and combination of the various parts, as shown in the accompanying drawings, and which are hereinafter more fully and perfectly described.

Figure 1 is a plan view of my improved three-horse equalizer and circle attached to a tongue. Fig. 2 is an upper view, looking down upon the equalizer and circle attached to the tongue, and showing the arrangement of the adjustable bars to accommodate the changing position of the horses without disturbing the equal distribution of the draft. Fig. 3 is a view of the equalizer detached from the tongue, showing the simplicity of its construction. Fig. 4 is a view of the circle for attaching the equalizer to a wagon-tongue, giving a plain view of its entire construction.

Similar letters refer to similar parts throughout the several views.

In the accompanying drawings, which form a part of this specification, A represents the circle for attaching the equalizer to the tongue, and which is securely fastened thereto by means of the bolts H and H' passing through the circle and perforations in the tongue, the front one being the usual hammer-hole, the rear one to be made at the required distance in the rear and passing through the circle-braces $a$ and $a'$, underneath the tongue, where said bolts are fastened by a nut or bolt-key. The main bar B of the equalizer sits squarely upon the circle and is attached thereto by means of the hammer-strap $i$ and a hammer-bolt passing through the hammer-strap, main bar, and circle. Upon the upper or under side, and near the ends of the main bar B, are attached the adjustable bars C C by the loop F, fastened by a bolt with nut or key passing through perforations in both bars and loop. This loop F and bolt securely hold the adjustable bars in proper position, prevent turning over forward, and allow full freedom of movement of the adjustable bars C forward or backward without cramping. To the long arm of each adjustable bar C are securely fastened the loops D by two bolts, and reaching from each end of these loops D are the independent hooks E E, secured to the ring of the center whiffletree, which may be easily detached or attached, as occasion may require. By means of the perforations G in the bars C the draft may easily be adjusted to weaker or smaller horses by moving the fulcrum or draft-center of the adjustable bar or outer whiffletrees to the required perforations.

By this combination and construction I obtain compactness, strength, convenience, and adjustability to the common length of wagon-tongue with the advantage of having the horses close to the load free from side draft, and an equalizer and circle easily, conveniently, and firmly attached to the tongue of any wagon or machine.

What I claim, and desire to secure by Letters Patent, is—

The combination, with a tongue and draft-bar, B, of the circle A, provided with the curved braces $a\ a$, secured at their outer ends to the under face of the circle and extending under the tongue, the bolts H H', passing through the circle, tongue, and braces, and hammer-strap $i$, substantially as described, and for the purpose set forth.

PHILESTER G. ROWLEE.

Witnesses:
NATHAN CLARK,
EDWIN W. RATHBUN.